US012705259B2

(12) United States Patent
Failer et al.

(10) Patent No.: US 12,705,259 B2
(45) Date of Patent: Aug. 11, 2026

(54) TECHNIQUE FOR GENERATING VIEWS OF ARCHIVED BUSINESS DATA

(71) Applicant: Business Mobile AG, Kreuzlingen (CH)

(72) Inventors: Thomas Failer, Kreuzlingen (CH); Maximilian Ralph Peter Von Und Zu Liechtenstein, Douglas (IM)

(73) Assignee: Business Mobile AG, Kreuzlingen (CH)

( * ) Notice: Subject to any disclaimer, the term of this patent is extended or adjusted under 35 U.S.C. 154(b) by 860 days.

(21) Appl. No.: 17/133,887

(22) Filed: Dec. 24, 2020

(65) Prior Publication Data

US 2022/0207061 A1 Jun. 30, 2022

(51) Int. Cl.
*G06F 16/28* (2019.01)
*G06F 16/22* (2019.01)
*G06F 16/2457* (2019.01)

(52) U.S. Cl.
CPC .......... *G06F 16/287* (2019.01); *G06F 16/221* (2019.01); *G06F 16/2282* (2019.01); *G06F 16/24573* (2019.01)

(58) Field of Classification Search
CPC ............. G06F 16/287; G06F 16/24573; G06F 16/221; G06F 16/2282
See application file for complete search history.

(56) References Cited

U.S. PATENT DOCUMENTS 7,457,933 B2 11/2008 Pferdekaemper et al.
7,533,103 B2 5/2009 Brendle et al.
7,653,663 B1 * 1/2010 Wright ................ G06F 11/1448 707/999.2
7,895,238 B2 2/2011 Poness
8,260,813 B2 9/2012 Coldicott et al.
8,983,913 B2 3/2015 Held
9,164,998 B2 10/2015 Klevenz et al.
9,613,086 B1 * 4/2017 Sherman ............... G06F 16/248
11,429,264 B1 * 8/2022 Weir ..................... G06T 11/206
(Continued)

OTHER PUBLICATIONS

European Search Report dated Jun. 7, 2021 for Application No. 21150220.8-1213.

(Continued)

*Primary Examiner* — William P Bartlett

(74) *Attorney, Agent, or Firm* — Quisenberry Law PLLC; C. Dale Quisenberry

(57) ABSTRACT

An apparatus, a method and a non-transitory computer readable medium are described herein related to generating views for archived business objects. The views display query results which are retrieved from a relational database for archived business data. The views are generated with a view generator which makes use of both a catalog, a standard business object and a business object parser which may detect differences in terms of field names and foreign-key relationships between a standard business object and a customer-enhanced business object. The combination of standard business objects with a business object parser enables the re-use of components from a standard library of business objects across various clients without resulting data loss, especially when there are client-specific deviations from the standard model of business objects.

3 Claims, 6 Drawing Sheets

(56) References Cited

U.S. PATENT DOCUMENTS

| | | | | |
|---|---|---|---|---|
| 2007/0208780 | A1 | 9/2007 | Anglin et al. | |
| 2007/0255741 | A1 | 11/2007 | Geiger et al. | |
| 2008/0288918 | A1* | 11/2008 | Knura | G06F 8/34<br>717/106 |
| 2009/0063470 | A1 | 3/2009 | Peled et al. | |
| 2009/0271234 | A1 | 10/2009 | Hack et al. | |
| 2011/0087708 | A1 | 4/2011 | Teichmann et al. | |
| 2013/0212116 | A1 | 8/2013 | Filliettaz, III | |
| 2014/0075350 | A1 | 3/2014 | Gauthier et al. | |
| 2015/0081744 | A1 | 3/2015 | Pfeifer et al. | |
| 2015/0100553 | A1* | 4/2015 | Fabijancic | G06F 16/258<br>707/673 |
| 2018/0131678 | A1* | 5/2018 | Agarwal | G06F 9/54 |

OTHER PUBLICATIONS

Stephan Heuscher et al., Providing Authentic Long-term Archival Access to Complex Relational Data (further details in above European Search Report).

Bernhard Zeller et al., Benchmarking SAP R/3 Archiving Scenarios (further details in above European Search Report).

* cited by examiner

TECHNIQUE FOR GENERATING VIEWS OF ARCHIVED BUSINESS DATA

BACKGROUND OF THE INVENTIONS

1. Field of the Inventions

The document relates to systems, devices, methods, and related computer program products for viewing archive data. More particularly, this patent specification relates to auto-generating views and their user interfaces, wherein such views are useful in accessing archived business data stored on relational databases.

2. Description of the Related Art

Any discussion of the related art throughout the specification should in no way be considered as an admission that such related art is widely known or forms part of common general knowledge in the field. Unless otherwise indicated herein, the materials described in this section are not prior art to the claims in this application and are not admitted to be prior art by inclusion in this section.

The present inventions relate to the generation of views for viewing archived business data. Several methods for generating views are known that allow a user to view business data which is held in an archive database. Amongst these is the individual approach, which comprises the individual definition of archive objects. The individual approach requires the writing of individual export programs and the authoring of individual views. Another approach known to the prior art is the classical archiving approach. The classical approach involves archiving a data model which may have originally conformed to an industry-standard data. Because of the fact that possible customization of the production data model is ignored with the classical approach, standard data archiving programs can be used and, later on, standard views may be used to access the archived business data through a user interface.

SUMMARY OF THE INVENTIONS

The known view generators for archived business data suffer from either losing custom data in exchange for being able to re-use standard views, or conversely from high cost of implementation because of the need to manually engineer custom export programs and custom views with custom user interfaces, i.e. a cumbersome and highly laborious process.

The present inventor, however, has recognized that a middle ground is possible in that a standard object model can be used to define relationships between different types of tables and that on field level, auto-generated export programs and view-generating programs can take into account highly customized table fields and automatically transpose them onto the standard data model. Hence no data gets lost while making the transfer to the archive.

In accordance with a specific embodiment of the inventions, when data is stored on a production database, such as the database of an SAP ERP system for example, it is first transferred to an archive database, and in a second step a view is generated that allows a user to search and access the data on the archive database. In particular embodiments of the inventions both the archiving and the archive retrieval processes are enabled by common business objects. Such business objects may be realized through a standard data model. An example of such a standard data model would be a “sales order” business object, whereby the business object comprises the database tables for the sales orders header tables and the sales order line item tables. The difference between a standard business object and a customized business object is that a standard business object is normally defined by a vendor of an ERP (enterprise resource planning) system, such as SAP ERP for example. It is a task left for customers to adapt standard tables that are associated with a business object to their own requirements. Typically, custom fields can be added to standard tables and custom tables can also be defined, which then can be linked to standard tables through foreign key relationships. In accordance with an illustrative feature of the present inventions, a view, which is a search and display type user interface for a particular business object, may be generated by first making a user select a standard business object from a catalog of business objects. Once a business object is selected then the system may look up which database tables are associated with the business object. In an advantageous feature of the present inventions, the system may next connect to the production database and parse each table that is associated with the standard business object. An output of the parsing process may be metadata relating to the table schema associated with the business object. In particular, one such output may be a field catalog of all fields in a table, including any custom fields which have been added by the customer to the standard data model. One more output may be custom tables, which may be linked to the standard tables of the business object by foreign key relationships. In the next step a view may be defined. In a preferred embodiment a view is implemented on a webserver as a user interface made up of a series of web pages which have been implemented with HTML5 and Javascript technology. Those skilled in the art will realize that a view can be implemented with any technology capable of producing a user interface, including Windows apps or Android apps. An advantageous aspect of the instant inventions is that a view may be generated either automatically, or with minimal user interaction, whilst at the same time not omitting any data that is part of the customized data model on the production database. In order to realize that goal, a view generator, which is implemented according to principles of the present inventions, may let a user select any table fields which are comprised in the production-derived metadata for either search or display fields. Once the desired makeup of a view is finalized by the user, then an auto-generation feature may be started, wherein said auto-generation may generate the SQL queries necessary to query the archive database and wherein said auto-generation may also generate the user interface artefacts necessary to search and display the archive data relating to a business object.

Other features, aspects and advantages of the present inventions will become apparent from the following discussion and detailed description.

BRIEF DESCRIPTION OF THE DRAWINGS

Example embodiments will become more fully understood from the detailed description given herein below and the accompanying drawings, wherein like elements are represented by like reference characters, which are given by way of illustration only and thus are not limitative of the example embodiments herein.

While the inventions will be described in connection with the preferred embodiments, it will be understood that the scope of protection is not intended to limit the inventions to those embodiments. On the contrary, the scope of protection is intended to cover all alternatives, modifications, and equivalents as may be included within the spirit and scope of the inventions as defined by the appended claims.

DETAILED DESCRIPTION OF THE INVENTION

Figure 1:
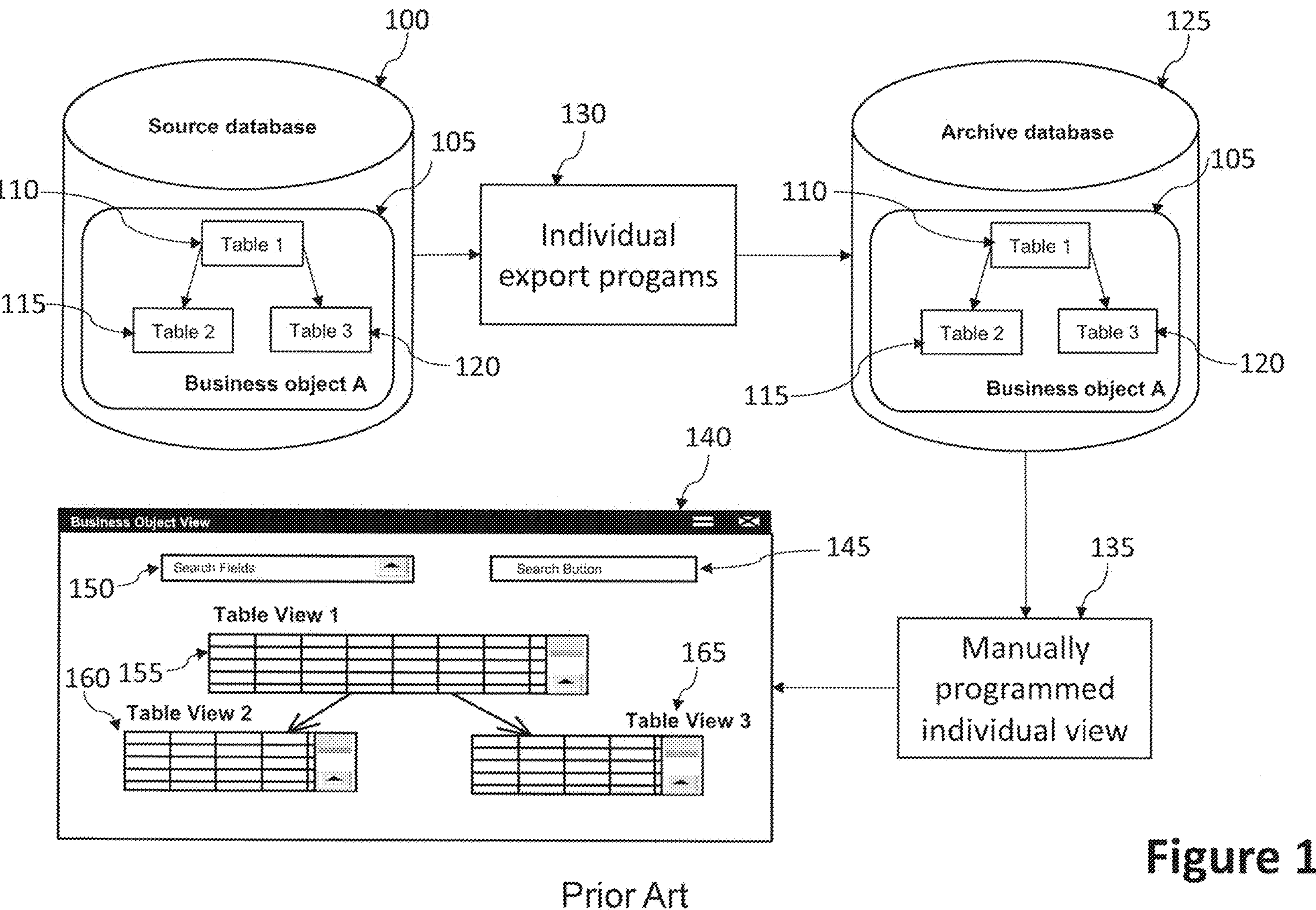
FIG. 1 depicts a type of archive view generating procedure known in the prior art.
Figure 2:
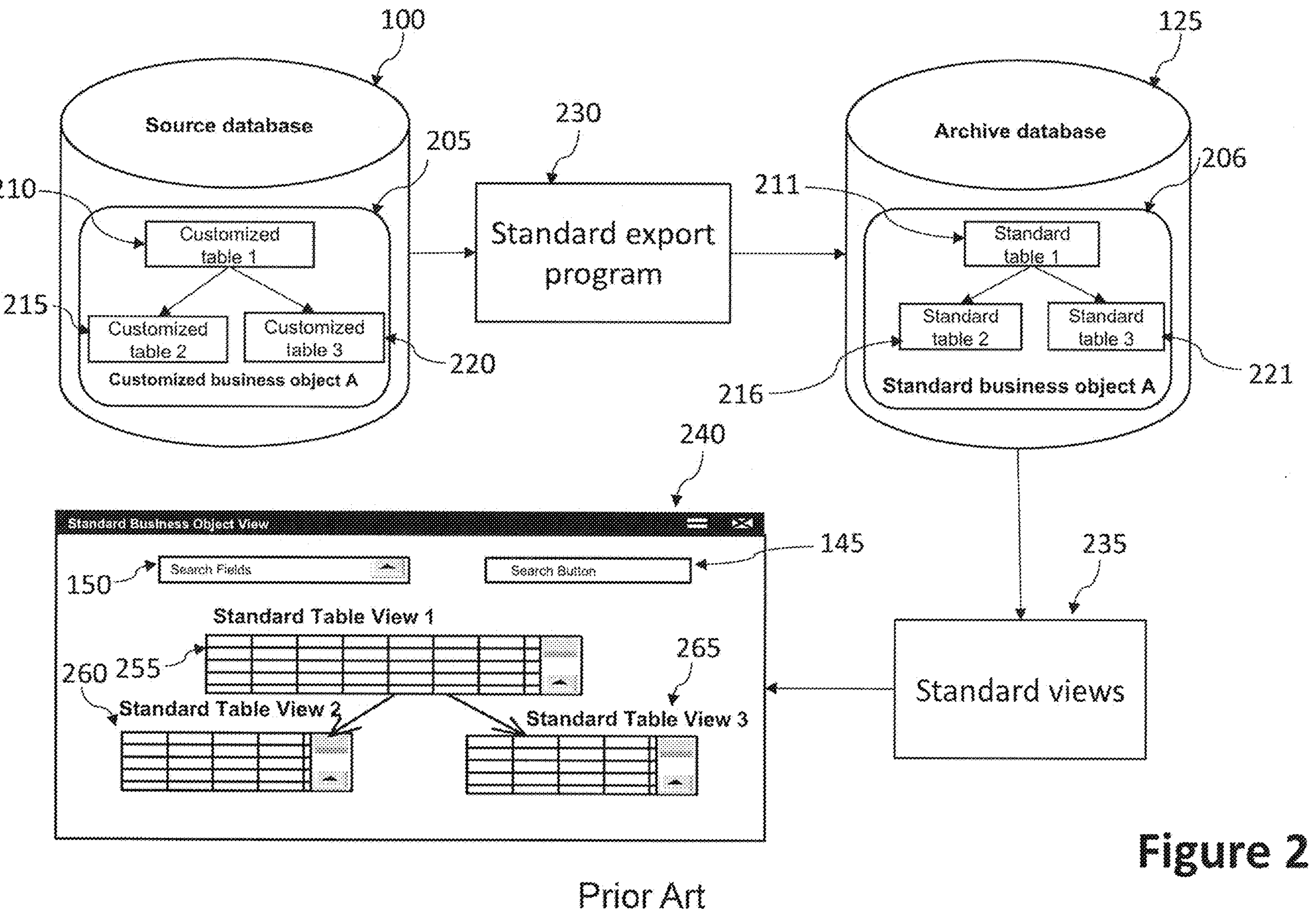
FIG. 2 depicts another type of archive view generating procedure known in the prior art.

Among the archive view generation techniques known to the prior art are those shown in FIGS. 1 and 2.

FIG. 1 depicts an individual approach to archive view generation. An individual approach involves a custom archive solution for each production database. A production database 100 may be any relational database containing business data. This may be a multi-model database management system such as an Oracle database, or an in-memory, column-oriented, relational database management system such as SAP HANA for example. A production database may also be a logical database, in the sense that there is a logical layer implemented on top of the database layer. In SAP ERP, one of the leading enterprise resource planning systems, there are three kinds of logical tables, which are simulated in a database-vendor independent layer on top of the vendor-dependent core database. In SAP there are Transparent Tables which exist with the same row and column structure as in the underlying physical database, but there may be differences in the technical data types; there are also Pooled Tables where the data of a plurality of these pooled tables is stored in a common table in the physical database; and there are also Cluster Tables which store key value pairs, wherein the keys are the same in the physical database, but the values comprise data, possibly including row or table data, which is compressed and/or encrypted before being stored in the underlying physical database. An archive database 125 may be any data store capable of long-term storage of table data which has been transferred from a production database. Hence in the context of this specification the term archive database is not limited to a database filled with aged business data for the purpose of data retirement. As an example, the novel techniques presented hereinafter may also be useful in a data migration context, where all data from a source system is transferred, as opposed to only aged data. An archive database may be implemented with various technical architectures, whereby the possible architectures comprise those of the production database. An archive database may also be implemented with file-based approaches, such as SAP's ADK approach, wherein a production database is archived with table records being written into files and where an index table is maintained that allows efficient searching for the relevant records in the relevant archive files. It is common practice to define business objects 105 in order to group tables which are related to a header table. An example of a business object would be a sales order. There will preferably be a leading table of sales orders, which is referred to as the header table. Any sales order may have line items, for which there is a one-to-many relationship. Consequently, the line items would normally be stored in a separate table with a foreign key relationship to the header table. Also, a sales order may store price finding data and textual data in yet more related tables. Hence a header row, i.e. a row in the header table, may link to many other tables and there may be different kinds of relationships between those table. Therefore a business object may be made up of a header row in a header table and potentially many rows in many related tables, whereby the related rows may be related in a business context to the header row. Table 1 110 is an example of such a header table. Related tables Table 2 115 and Table 3 120 are related to Table 1 in a business context and they may be linked through foreign key relationships. It is important to note that in the "individual" approach to archiving, which is described in FIG. 1, there are the same business objects with the same underlying tables both in the source database 100 and in the archive database 125. Essentially the business objects in the archive database 125 are exact copies of the business objects in the source database 100. It is important to note that they are copies in a business sense, not necessarily on a technical level. So, whilst the archive database contains the same business data, that data may be stored in a different file format or database format. The data types may also be different. Hence when business data is moved from a source database running Oracle to an archive database running MSSQL, it is to be expected that the technical data types may be slightly different, but crucially when that business data is retrieved through a viewer, then the viewer will see the same business data as would have been visible on the source system. In the "individual" approach it is necessary to write individual export programs 130 in order to transfer the data from the source database 100 to the archive database 125. This is one major disadvantage of the "individual" approach, because rather than being able to purchase on "off the shelf" type industry-standard archiving solution, an operator of a source database 100 has to employ very considerable efforts and associated costs in order to retire business data to an archive database. It often defeats the objective of saving costs in any case. For what is the benefit of retiring data to an archive database, when the overall costs of the "individual" approach to archiving are in fact greater than leaving the aged data in the production database in the first instance. Another factor is the need to program a series of views for the archived data. Archiving data only serves its objective if the aged data is not only safely retired to the archive database, but if there is also a user interface to search and retrieve the aged data. Whilst the aged data is still in the production system, the tools, reports and application programs of the production system can be used to access the aged data. However, on an archive database, no such array of tools is available. Hence a custom user interface has to be laboriously programmed in order to view and retrieve the archived data, should the need ever arise. Programming such user interfaces for searching and retrieving archived data is a task that generally is even more laborious and costly than writing the export programs to transfer the aged data. Hence the "individual" approach comprises programming a manually programmed individual view 135 in order to be able to view business object A 105, once it resides in the archive database 125. A business object view 140 may comprise one or more search fields 150 and a command interface for executing a search, commonly a button 145. A business object view 140 may also comprise a result screen, which in turn comprises Table View 1 155, which is visual rendition of a table of results which may be based on the primary keys of the header table 110. It is important to note that Table View 1 155 does not need to exhibit the same schema as Table 1 110. It is possible to flatten a business object without losing data. An example would be a sales order, where on the database there are separate tables for sales orders and for sales order line items. A view of such data could combine both tables into a single table view, which contains the full set of information of the underlying tables in one single view table, where each row contains a line item plus the corresponding header data. However, commonly the table views tend to closely correspond to the underlying database tables. Hence in the example embodiment Table View 1 155 corresponds to Table 1 110, and conversely Table View 2 160 corresponds to Table 2 115, whilst Table View 3 165 corresponds to Table 3 120.

FIG. 2 depicts another prior art approach to creating archive views. It is often termed the "classical" approach, because unlike the extremely costly "individual" approach, it enjoys widespread industry support due to fact that it is relatively quick and easy to implement. This ease of use is owed to the fact that it allows vendors of archiving solution to offer one-fits-all types of "off-the-shelf" archiving and view generating solutions. Hence even if the source database 100 may be heavily customized to an individual firm's requirements, with custom tables and custom fields, the archive database only offers an industry-standard data model and the archive views are also standard views built around the standard data model. Sometimes vendors of such solutions offer the customers to enhance the standard views and the standard data models in order to better reflect the actual production data, but such a process of manually enhancing standard business models and standard views can be very laborious. In fact, such a task can be similar in scope and in cost, that it compares to the "individual" approach. Hence often a customer is put before the choice of either using a standard data model bought "off-the-shelf" and accepting inevitable data loss, or implementing an "individual" approach by either writing the archive solution from the ground up or by spending an almost similar effort in enhancing an industry-standard solution. This is exemplified in FIG. 2 whereby a customized business object A 205 on the source database 100 is transposed into standard business object A 206 on the archive database 125. Likewise, customized table 1 210, the header table, corresponds to standard table 1 211, whilst customized table 2 215, corresponds to standard table 2 216 and customized table 3 220, corresponds to standard table 3 221. Because of the fact that the customized tables 210, 215 and 220 were originally based on standard tables 211, 216 and 221 it is possible to use a standard export program 230 in order to move aged data from the source database to the archive database. However, the standard export program 230 will only be able to transport those fields and tables which are comprised in the standard data model. Any field or tables that have been added by the customer after originally adopting the standard data model will necessarily be lost. One of the main advantages of the "classical" approach is that standard views 235 provide a ready-made user interface for accessing archive data. Item 240 is an example of a standard business object view. In contrast to the "individual" approach wherein the result lists comprised custom fields and custom tables, in the "classical" approach only industry-standard table views are shown to the user, such as Standard Table View 1 255, Standard Table View 2 260 and Standard Table View 3 265 in the depicted example embodiment.

Figure 3:
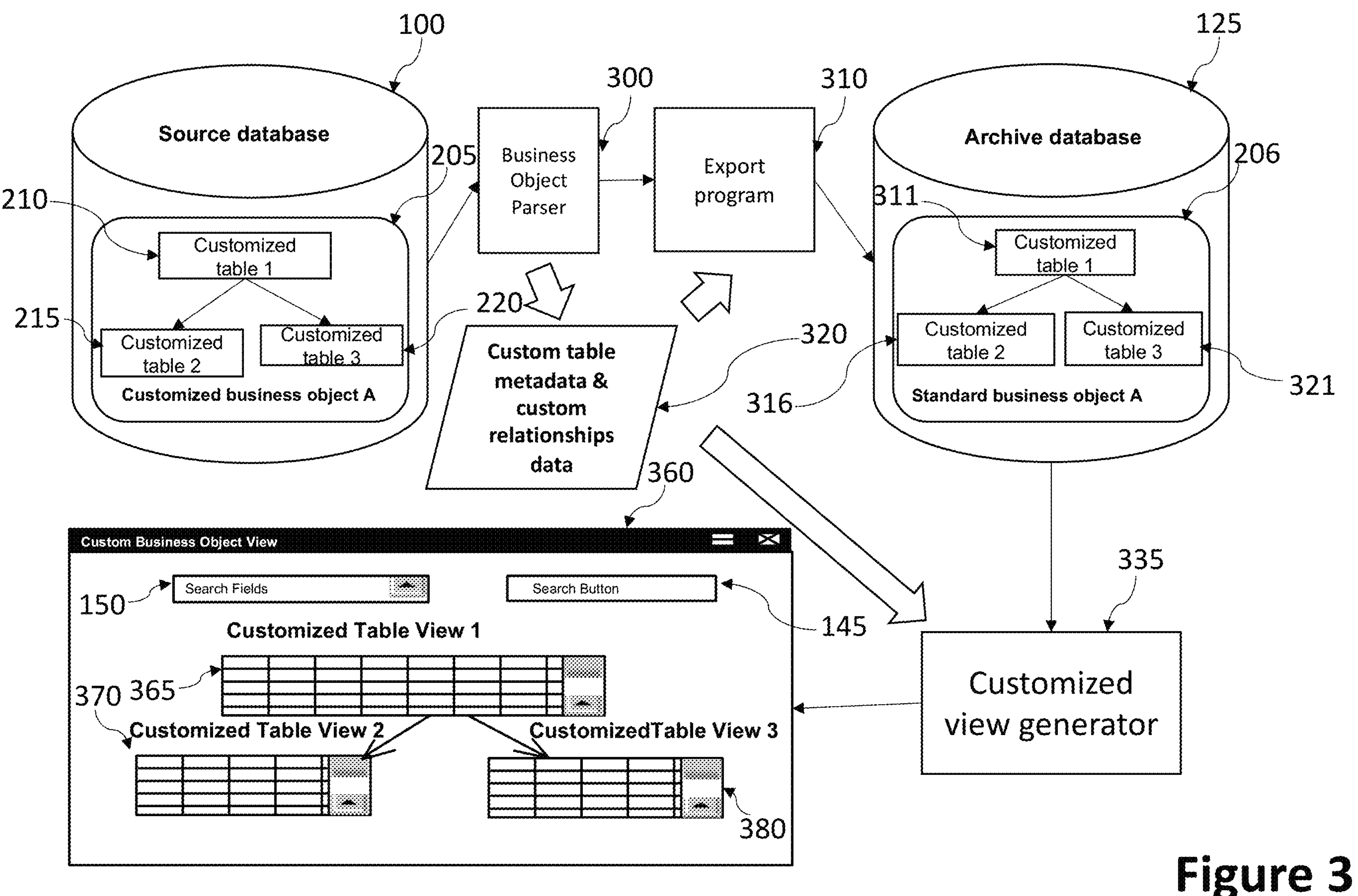
FIG. 3 depicts an archive view generating procedure making use of standard business objects in connection with parsed custom table metadata, embodying the principles of the present invention.

FIG. 3 depicts a view generating technique embodying the principles of the present inventions that is more cost-efficient than the prior art approaches whilst at the same time ensuring that custom data in custom tables or custom fields of standard tables is not lost during the process. A system which embodies the present inventions may hence comprise a Business Object Parser 300. A Business Object Parser is a program which has access to definitions of standard business objects and which then accesses a production database and automatically or semi-automatically determines divergences from the standard data model. An embodiment of the present inventions has implemented a Business Object Parser as a JAVA program which connects to a production database, via the JDBC driver, whereby the production database is an Oracle Database v19c. JDBC drivers are client-side adapters (installed on the client machine, not on the server) that convert requests from Java programs to a protocol that the DBMS can understand. The JDBC driver has been used to extract metadata from the data sources corresponding to the production system. Metadata generally includes the name, size and number of rows of each table present in a database, along with the columns in each table, their data types, precisions, etc. To get metadata from the data source using a JDBC driver, the getMetaData( ) method is called, using the Connection object. Those skilled in the art will realize that many other ways of connecting to a database and extracting metadata are possible. There are many drivers other than the JDBC drivers and most of these offer methods for extracting metadata. An example embodiment extracts metadata in a series of steps: First, a business object definition is loaded from a repository of standard business objects. A business object definition may comprise a list of tables, an indication of which of these tables constitutes the header table and an indication of how the tables in the list are related to each other; Second, for each table comprised in a business object definition the metadata of the corresponding tables on the productive database is queried; Third, for each table comprised in a business object definition find related tables which are linked through a foreign key relationship. The third step is optional in the sense that steps one and two are still useful in their own right and that the third step brings added value.

The second step may be carried out on an Oracle production database, for example,

```
with the following SQL statement:
select t.table_name,
     , t.column_name
     , t.data_type
   from user_tab_columns t
     left join user_cons_columns cc
       on (cc.table_name = t.table_name and
          cc.column_name = t.column_name)
where t.table_name= 'BO_TABLE_NAME');
```

The third step may be carried out on an Oracle production database, for example, with the following SQL statement:

select * from all_constraints where r_constraint name in (select constraint name from all_constraints where table_name='BO_TABLE_NAME');

The term BO_TABLE_NAME is a placeholder that stands for a table within the business object definition. The third step thus executes an SQL statement which yields all linked tables for a table in a business object definition. Similar SQL queries exist for different DBMS and those skilled in the art will realize that the third step may be carried out with any other alternative SQL statement that is capable of returning as an output all tables which are linked to an input table. Optionally the third step may also use a filter, which can identify which of the linked tables is a custom table that has been defined as a business object related table by the customer. Such a filter may make use of naming conventions which indicate a customer table. For example, in SAP systems customer tables which are added to an SAP-standard business model are routinely prefixed with either a Z or a Y. Another possible filter criterion is the table creator, as revealed from the table metadata. The table creator may indicate if a certain table has been created when the standard data model was initially installed, or afterwards by a different user. The output of the Business Object Parser 300 is custom table metadata along with custom data relationships 320. In a preferred embodiment the Business Object Parser 300 writes the custom table metadata & custom relationships data to an XML file in the file system.

The system for generating archive views, pursuant to principles of the inventions, may also comprise an export program 310. The purpose of the export program 310 is to extract the aged business data from the source database 100 and to transform it into a form that can be imported into the archive database 125. In a preferred embodiment the generated export program may be a JAVA program which outputs comma-separated files (CSVs), wherein CSV is a data format which can be used to import data into most common databases. Those skilled in the art will realize that there are many equally suitable alternatives for exporting data in a format that can be imported by an archive database. In a preferred embodiment the export program 310 is auto-generated by using the Apache Velocity framework. Velocity is a Java-based template engine. It permits using a simple template language to reference objects defined in Java code. It can be used to generate SQL, PostScript and XML, from templates. It can be used either as a standalone utility for generating source code and reports, or as an integrated component of other systems. There are other template engines, which are equally useful for auto-generating the export program 310. It is not even necessary to use a template engine; the code for the export program 310 may also be written as a manual effort in any programming language. In accordance with an advantageous feature of the present inventions the generated export program 310 may be enabled for reading and outputting custom fields in standard tables and custom tables linked to standard tables. Due to the export program 310 being capable of outputting also the custom fields of a customized business object, the standard business object A, comprises not a set of standard tables, as in the prior art, but the same customized tables as in the source database 100. Hence, in the depicted example embodiment customized source tables 210, 215 & 220 translate to customized target tables 311, 316 & 321. Except for the technical data types, the business data contained in the target tables fully matches that of the source tables. The customized view generator 335 is a component in an exemplary embodiment which is tasked with generating a search, list and display type user interface for a selected business object. In one embodiment the view generator 335 has been implemented as a JAVA program which takes as input both the custom table metadata & custom relationship data 320 and the corresponding object model of a standard business object 206. In an alternative embodiment instead of reading previous output from the Business Object Parser 300, as stored during or after creation of the business object in the archive database 125, it is also possible to invoke the business object parser 300 as part of the operation of the customized view generator 335. So, the customized view generator 335 may either read previously stored custom table metadata & custom relationships data 320, or it may explicitly cause the generation of such data by directly invoking the business object parser 300. The output of the customized view generator 335 may be a customized business object view 360 which is a user interface for search, list and display of an archived business object. It is important to note that in contrast to a standard business object view 240 (see FIG. 2) a customized business object view 360 comprises a representation of the tables that make up a business object, as they appear on the source database 100, i.e. the customized business object view may contain both the customer-specific fields that are not in the standard data model as well as non-standard customer tables added to the standard data model. Hence view 360 may comprise a customized table view 1 365 which relates to the business object header table 210, i.e. an originally standard table which has been enhanced with customer-specific fields. Likewise, customized table views 370 and 380 relate to customer-enhanced tables 215 and 220 respectively.

Figure 4:
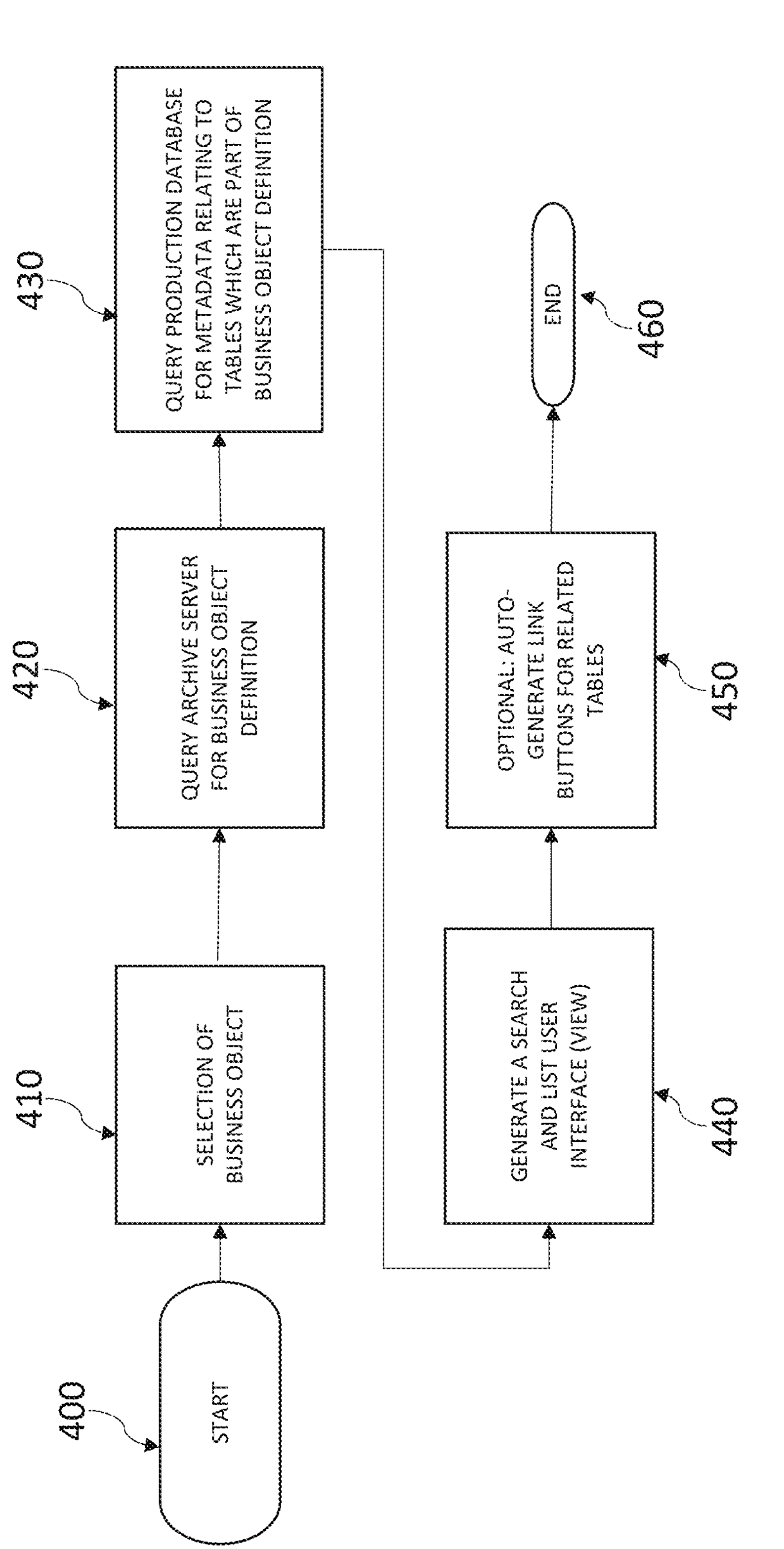
FIG. 4 is block diagram depicting the sequence of operations for generating an archive view, according to an example embodiment.

FIG. 4 relates to a flow diagram that illustrates the sequence of steps when a view is generated, according to an example embodiment. At the start 400 one or more business objects are selected 410. In one example embodiment a business object may be selected by being presented with a selectable list of business objects whereby the selectable list is part of a user interface that has been realized as a JAVA program and whereby the selectable list has been pre-installed with the JAVA program. Alternative ways of selecting a business object are also possible. The next step 420 may be the querying an archive server for a business object definition. A business object definition may also be stored on a server different to the archive server or on the same computer which is hosting the user interface. The next step 430 involves retrieving metadata relating to tables which are part of the business object definition. Such metadata is associated with an output of the business object parser 300. Step 440 involves generating a search, list and display type user interface for the selected business objects. As an optional step 450 auto-generated link buttons may be inserted into the user interface. Such link buttons relate to sub-views in the same view. Sub-views which are linked are based on tables which exhibit primary keys which are comprised in the field catalog of the primary view. So, when a view is generated, the primary key fields of all tables of the business object may be automatically compared against the field catalog of the view. If the primary keys of such a table are found in said field catalog, then a link to a sub-view may be inserted in the user interface, whereby the sub-view relates to said table. The flow in FIG. 4 is ended with 460.

Figure 5:
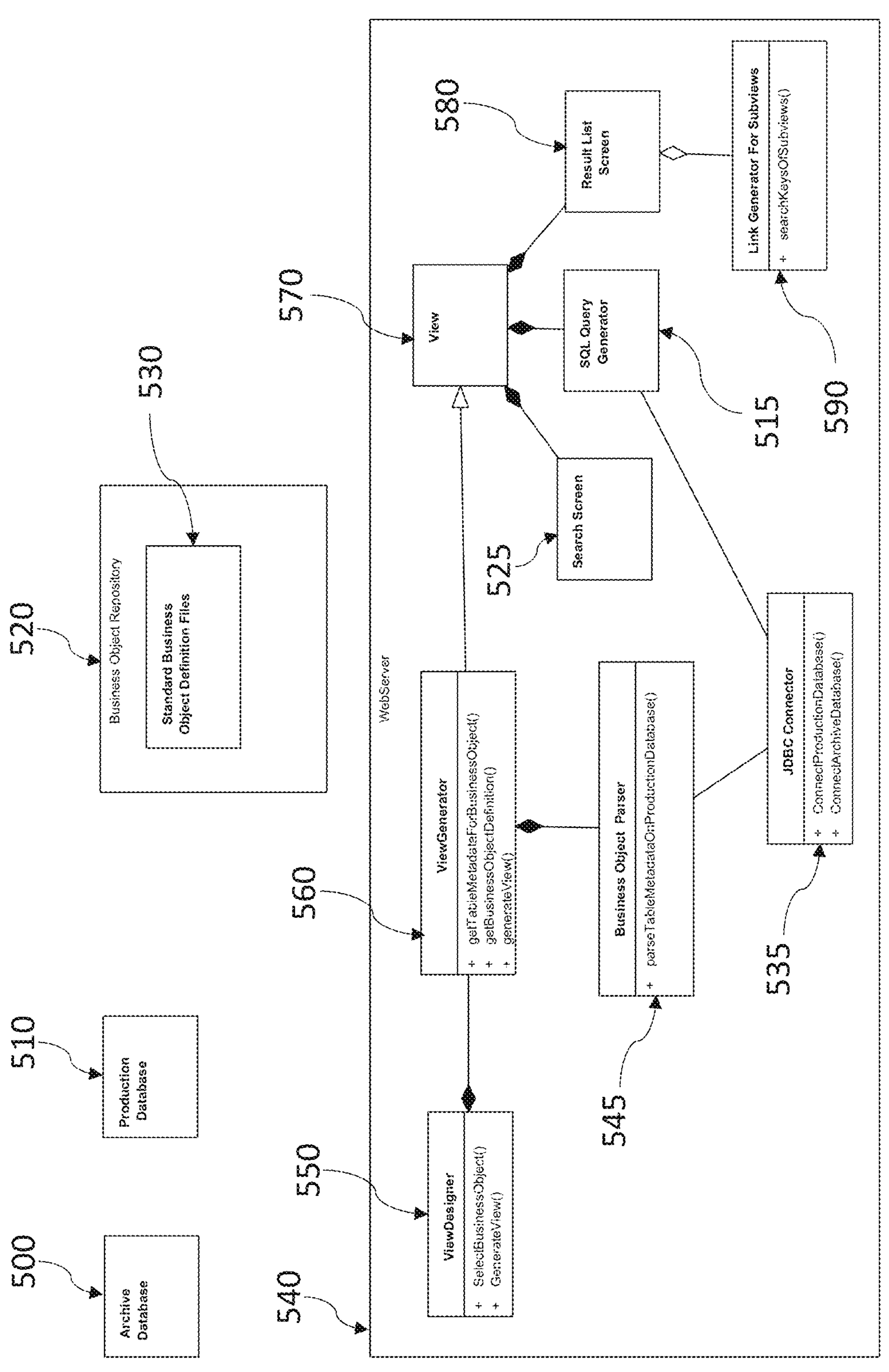
FIG. 5 is system diagram depicting the components which ae utilized in the archive view generating procedure, according to an example embodiment.

FIG. 5 is a UML-compliant system diagram of an example embodiment which is implementing the view generator on a web server 540. The generated views 570 have access to an archive database 500 that comprises retired business data from a production database 510. A business object repository 520 may be used to serve standard business object definition files 530. An embodiment of the present inventions may serve the business object definitions as XML files, whereby a business object definition may comprise definitions relating to which tables make up a business object; which of these tables is the header table; and information indicating how the tables are related to each other. In alternative embodiments business object definitions may be stored in other suitable formats or in other suitable storage locations. A view 570 may comprise a search screen 525, an SQL query generator 515 and a result list screen 580. The result list screen 580 may further comprise a link generator for sub-views 590, which in the example embodiment has a method "searchKeysOfSubviews( )" for taking each field in the field catalog of the primary view and for searching through the primary keys of the tables forming part of the business object in order to find a match. A view generator 560 may be associated with a view designer 550, wherein the view designer in the depicted example comprises methods "SelectBusinessObject( )" for selecting a business object on which a view is to be generated and method "GenerateViewO" for starting off the view-generating process of which view 570 is an output. The view generator 560 comprises method "getTableMetadataForBusinessObject" for retrieving table metadata from the production database 510 for the tables that are associated with a given business object; as well as method "getBusinessObjectDefinition( )" for retrieving the definition of a business object from the business object repository 520; as well as method "generateView( )", which serves as the command for starting off the view generation process. The view generator 560 is associated with the business object parser 545, which in turn may comprise a method "parseTableMetadataOnProductionDatabase( )", which may connect to the production database 510 in order to parse the tables which make up a business object definition. The connection to either the archive database 500 or the production database 510 may be effected by the JDBC connector 535 with methods "ConnectProductionDatabase( )" and "ConnectArchiveDatabase( )" respectively.

Figure 6:
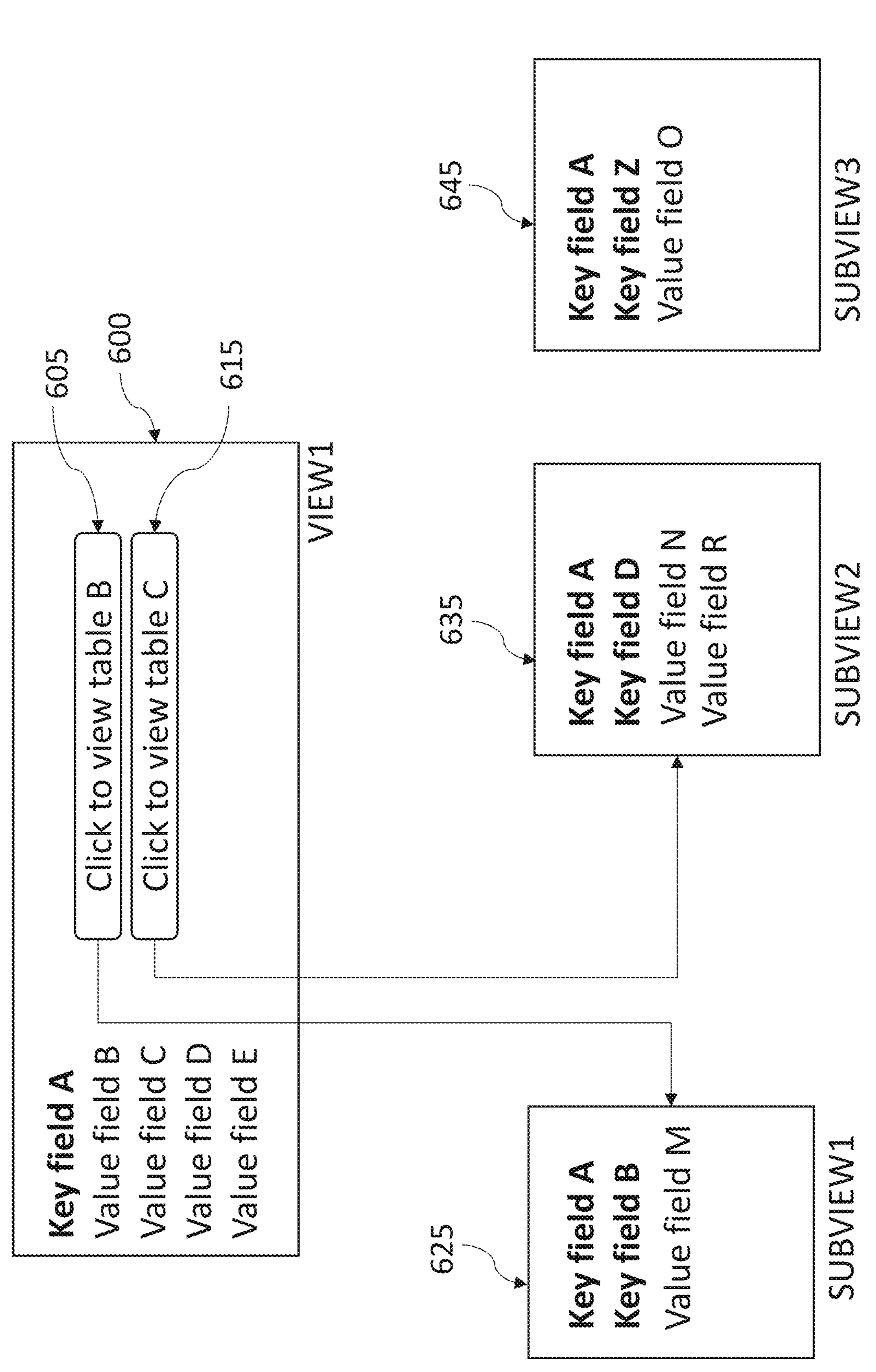
FIG. 6 is symbolic user interface of an archive view depicting the auto-generation of links to sub-views with foreign key relationships to the primary view, according to an example embodiment.

FIG. 6 provides further detail regarding the linking to sub-views as referenced in 590 in FIGS. 5 and 450 in FIG. 4. View 1 600 relates to a result list that is displayed after a successful search for a business object. The view relates to a table that has a primary key comprising a field A. Alongside the key values the view also displays a number of value fields, namely B, C, D and E in the depicted example. There also exist three sub-views, namely sub-view 1 625, sub-view 2 635 and sub-view 3 645. Subview 1 625 has primary key fields A and B. Due to fields A and B also being part of the field catalog of view 1 600, a link 605 may be displayed alongside field B in view 1 600. There is a similar situation with sub-view 2 635, whereby primary key fields A and D can both be found in the field catalog for view 1 600. Hence a link 615 to sub-view 2 635 is displayed in view 1 600. The link is displayed in vicinity of value field D in view 1 600 in order to better illustrate the circumstance that field D in table A (on which view 1 600 is based) is a foreign key to table C (on which sub-view 2 635 is based). Sub-view 3 645 is not referenced with a link in view 1 600 because key field Z is not a field which is comprised in the field catalog of view 1 600. As an alternative to displaying links such as 605 and 615 whenever the primary keys of a subview match the field catalog of a view, another embodiment uses a configuration data structure, termed activation fields groups hereinafter, which explicitly links a set of fields in the field catalog of a business object with the display of a link to a certain sub-view. An example of such an activation field group, is the following instruction in pseudo code: "If the fields A, D and F occur in any view of the business object 432, then display a link to sub-view 23 and use said fields as keys when querying said sub-view". Activation field groups may be defined to apply to any view which is connected to a business object, or they may alternatively be restricted to a single view, of which the following pseudo code would be an example: "If the fields A, D and F occur in view 432 of business object 882, then display a link to sub-view 23 and use said fields as keys when querying said sub-view".

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims.

The above detailed description describes various features and functions of the disclosed systems, devices, and methods with reference to the accompanying figures. In the figures, similar symbols typically identify similar components, unless context dictates otherwise. The example embodiments described herein and in the figures are not meant to be limiting. Other embodiments can be utilized, and other changes can be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

With respect to any or all of the diagrams, scenarios, and flow charts in the figures and as discussed herein, each block and/or communication can represent a processing of information and/or a transmission of information in accordance with example embodiments. Alternative embodiments are included within the scope of these example embodiments. In these alternative embodiments, for example, functions described as blocks, transmissions, communications, requests, responses, and/or messages can be executed out of order from that shown or discussed, including substantially concurrent or in reverse order, depending on the functionality involved. Further, more or fewer blocks and/or functions can be used with any of the diagrams, scenarios, and flow charts discussed herein, and these diagrams, scenarios, and flow charts can be combined with one another, in part or in whole.

A block that represents a processing of information can correspond to circuitry that can be configured to perform the specific logical functions of a herein-described method or technique. Alternatively or additionally, a block that represents a processing of information can correspond to a module, a segment, or a portion of program code (including related data). The program code can include one or more instructions executable by a processor for implementing specific logical functions or actions in the method or technique. The program code and/or related data can be stored on any type of computer readable medium such as a storage device including a disk or hard drive or other storage medium.

The computer readable medium can also include non-transitory computer readable media such as computer-readable media that stores data for short periods of time like register memory, processor cache, and random access memory (RAM). The computer readable media can also include non-transitory computer readable media that stores program code and/or data for longer periods of time, such as secondary or persistent long term storage, like read only memory (ROM), optical or magnetic disks, or compact-disc read only memory (CD-ROM), for example. The computer readable media can also be any other volatile or non-volatile storage systems. A computer readable medium can be considered a computer readable storage medium, for example, or a tangible storage device.

Moreover, a block that represents one or more information transmissions can correspond to information transmissions between software and/or hardware modules in the same physical device. However, other information transmissions can be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

Definitions and Clarifications

Herein below are a few definitions and clarifications. As used herein:

The terms "a" and "an", when modifying a noun, do not imply that only one of the noun exists.

The term "comprise" (and grammatical variations thereof) shall be construed broadly, as if followed by "Without limitation". If A comprises B, then A includes B and may include other things.

The term "e.g." means including without limitation. The fact that an "example" or multiple examples of something are given does not imply that they are the only instances of that thing. An example (or a group of examples) is merely a non-exhaustive and non-limiting illustration.

The term "include" (and grammatical variations thereof) shall be construed broadly, as if followed by "Without limitation".

The term "or" is an inclusive disjunctive. For example "A or B" is true if A is true, or B is true, or both A or B are true.

A parenthesis is simply to make text easier to read, by indicating a grouping of words. A parenthesis does not mean that the parenthetical material is optional or can be ignored.

The invention claimed is:

1. An apparatus for viewing business data, the apparatus comprising:

- a business object parser for retrieving metadata from a relational database, wherein said metadata comprises metadata of customized tables, metadata of customized fields comprised in said tables and metadata of foreign key relationships comprised in said customized tables;
- an interface to a repository, wherein said repository stores a plurality of standard business object definitions, wherein a standard business object definition comprises a plurality of standard table definitions, wherein at least one of said standard table definitions comprises a plurality of standard field definitions, and wherein at least one of said standard table definitions comprises one or more standard foreign key relationship definitions; and
- a view generator for generating a custom business object view of a standard business object wherein said standard business object is populated with archived data from said relational database wherein said view is generated by combining said metadata and said definition of a standard business object in such a way that at least one customized field of a customized table becomes both visible and searchable in a generated search and display type user interface for said standard business object.

2. The apparatus of claim 1 further comprising a link generator for sub-views, wherein said link generator is configured to scan a repository of activation field groups for a match, wherein an activation field group comprises a plurality of field names and a link to a sub-view, wherein said match is detected when said plurality of field names is found in a field name catalog derived from metadata of a customized table.

3. The apparatus of claim 1, wherein said view is generated by combining said metadata and said definition of a standard business object in such a way that at least one of said foreign key relationships is depicted in a generated search and display type user interface for said standard business object and wherein said foreign key relationship is not comprised in said one or more standard foreign key relationship definitions.

* * * * *